United States Patent [19]

Boretius

[11] Patent Number: 5,451,935

[45] Date of Patent: Sep. 19, 1995

[54] ELECTRONIC ARRANGEMENT FOR THE INITIATION OF AN ACTION BY MEANS OF A KEY ELEMENT

[76] Inventor: Michael Boretius, Vogelmauer 29, 86152 Augsburg, Germany

[21] Appl. No.: 86,724

[22] Filed: Jul. 2, 1993

[30] Foreign Application Priority Data

Jul. 4, 1992 [DE] Germany ............... 9208990 U
Oct. 19, 1992 [DE] Germany ............... 9214097 U

[51] Int. Cl.[6] .................. H04Q 3/00; H04B 1/59
[52] U.S. Cl. .................. 340/825.34; 340/825.31; 361/179
[58] Field of Search .......... 340/825.31, 825.34, 340/825.35; 361/171, 179

[56] References Cited

U.S. PATENT DOCUMENTS 4,453,161  6/1984  Lemelson ............... 340/825.31
4,622,551  11/1986  Kupersmith et al. ........ 340/825.31
4,723,121  2/1988  van den Boom et al. ..... 340/825.31
5,136,284  8/1992  Kitamura ................. 235/382.5
5,276,294  1/1994  Jalbert .................. 340/825.31

Primary Examiner—Donald J. Yusko
Assistant Examiner—Edward Merz
Attorney, Agent, or Firm—Klaus J. Bach

[57] ABSTRACT

In an electronic arrangement for initiating an action by means or a key element which includes a coded machine readable data memory and a data processing unit for initiating the desired action which includes a reading head for reading the data stored in the key element data memory, the key element data memory is a single contact storage module and also the reading head includes only single contact sensors through which, when contacted by a key element, data are exchanged in series-bit fashion through a single data transmission line, with the key element under the control of the data processing unit.

16 Claims, 6 Drawing Sheets

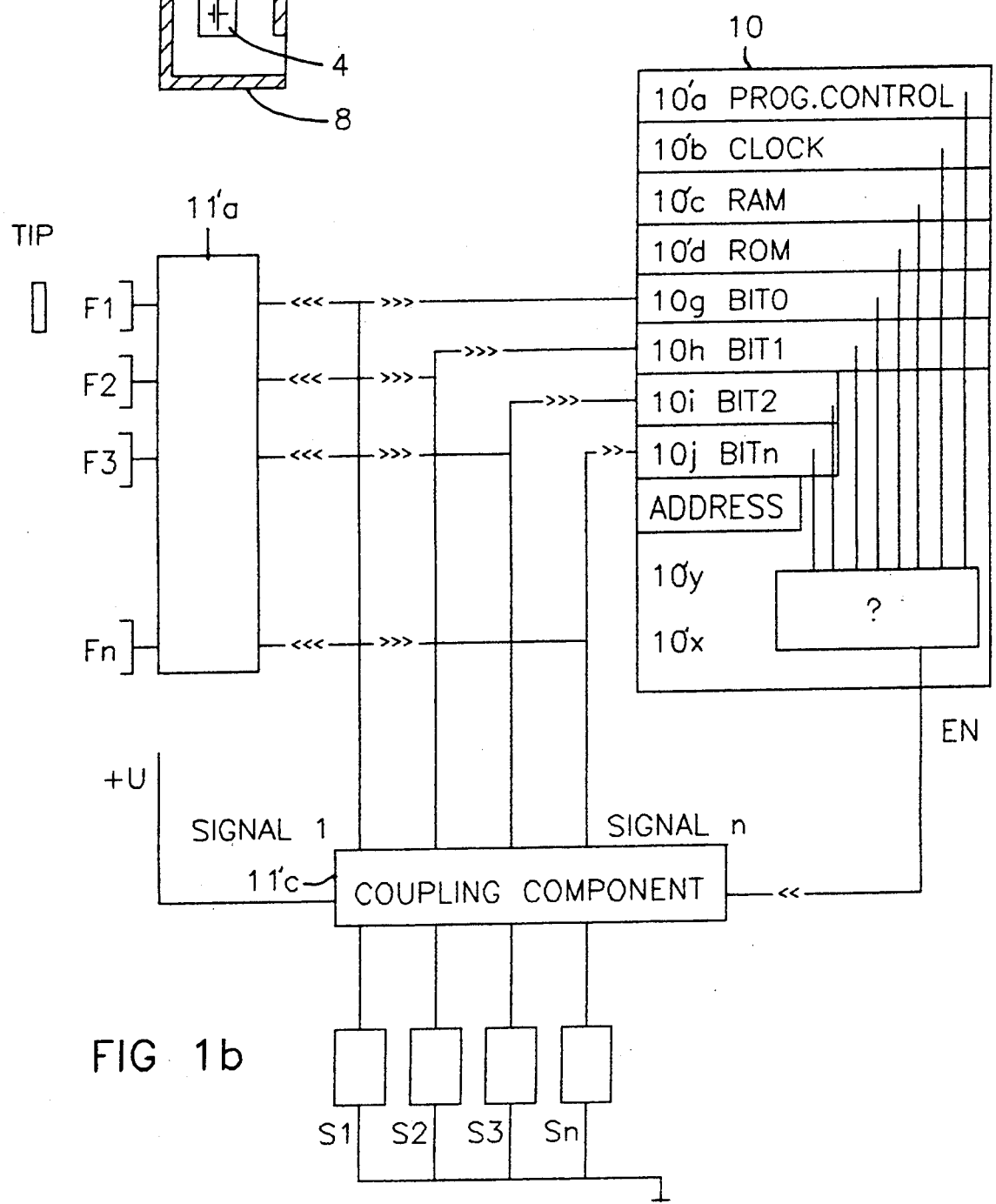

ELECTRONIC ARRANGEMENT FOR THE INITIATION OF AN ACTION BY MEANS OF A KEY ELEMENT

BACKGROUND OF THE INVENTION

The invention relates to an electronic arrangement for the initiation of an action, such as opening of a gate or release of services or goods, by means of a key element.

Known apparatus of this type are, for example, magnetic card apparatus which utilize magnetic card readers and magnetic cards as keys for unlocking a structure. Such apparatus are used for the opening of parking building gates, for the opening of doors by authorized persons, in connection with money machines and so on. To achieve the particular result, for example, opening of parking building gates, unlocking of a door or the release of money is achieved when a particular code is read from the magnetic card and, in some cases, for example, in connection with security passages or money machines, the user enters a personal identification number which identifies him as the proper owner of the magnetic card.

Magnetic card reading units however are very expensive and susceptible to malfunctions. Furthermore, magnetic card systems are not without problems for the user since, for reading the stored information, a well-defined movement is necessary. With a slot reader the user must slide the magnetic card through the slot by hand as evenly as possible. With motor-operated magnetic card readers a good transmission is assured but the insertion of the card into the reading slot requires careful handling. In addition, a psychological threshold must be overcome when the card disappears in the reading unit. And last, but not least, magnetic card reading systems are subject to vandalism because they have the open reading slots and their repairs are always quite expensive.

Other known devices of this type use punched-hole cards as key elements. They are used, for example, to start a particular variable operating program of an apparatus, for example, of an automatic car wash. In that case, a sensor in a reading slot analyzes the arrangement of the holes in the card inserted into the slot and provides for a particular series of control signals.

These devices are not as much prone to failures and have fewer handling problems than magnetic card reading systems but they have the disadvantage that they are not suitable for security systems because the key card contains its data in the form of a hole arrangement which is openly apparent and identifiable by unauthorized persons and therefore not safe from unauthorized copying.

It is the principal object of the present invention to provide an arrangement for initiating an action by means of a key element which can comply with safety requirements as well as it can provide for improved reliability as compared to magnetic card systems and which is easier and safer to handle than corresponding systems presently in use.

SUMMARY OF THE INVENTION

In an electronic arrangement for initiating an action by means of a key element which includes a coded machine readable data memory and a data processing unit for initiating the desired action which includes a reading head for reading the data stored in the key element data memory, the key element data memory is a single contact storage module and also the reading head includes only single contact sensors through which, when contacted by a key element, data are exchanged in series-bit fashion through a single data transmission line, with the key element under the control of the data processing unit.

The arrangement according to the invention with a key element including a single-contact memory module has the advantage that, like in the magnetic cards of the known systems, the stored data are machine readable but are otherwise invisible and not identifiable. The reading head of the arrangement according to the invention, being a contact sensor, merely needs to be contacted by the key element, that is, the single-contact memory module only needs to be placed in contact with the single contact sensor. No relative movement between the sensor and the key element is necessary; and there is no slot or opening in the reading device into which a key element needs to be inserted. The arrangement according to the invention is also substantially less expensive than magnetic card systems and is less susceptible to malfunction and offers no leverage inducive to vandalism.

The advantages pointed out above provide for wide application possibilities for the arrangement according to the invention, many of which are not suitable for magnetic card systems presently in use.

It is, for example, possible to provide an arrangement with a plurality of sensors for the initiation of a plurality of different actions wherein each action can be selectively chosen by contacting with the key element the sensor for the particular desired action.

With the arrangement according to the invention the key element may not only include key functions but, like with magnetic cards, it is possible to change the information stored in the single-contact memory module. In this manner actions can be initiated in which, in addition to the identification of the user of the key element, for example, money can be released from an account maintained in the key element memory. Examples herefor are telephone key elements similar to the known telephone cards, which are purchased to permit a predetermined amount of telephone usage or for the purchase of gasoline from automatic gas pumps, or similar applications. For use in connection with automatic gas pumps a plurality of sensors may be utilized, for example, to provide for the release of a certain amount of gasoline and of a desired quality.

The storage module of the key element of the arrangement according to the invention only needs to have the size of a disc battery or a coin and includes a storage chip with electronic circuitry and a battery which maintains the stored data for years, for example, up to 10 years, and which is hermetically encapsulated.

The information in the data storage module may be erased and new information may be imprinted by means of a commercially available computer and a metal sensor connected via a coupling component. A RAM storage module as described is a very low-cost item.

The reading or reading and recording head of the arrangement according to the invention is a simple metal sensor with which the storage module of the key element is contacted. The metal sensor is connected to the rest of the processor unit suitably by means of a coupling component which may be connected to a data processing module via a plug-in connector so that it can easily be replaced if it should fail. The program schedule of the data processing unit is automatically controlled by means of an associated control unit which may be present as a control module. The data processing unit also monitors the condition of the sensor and automatically reacts to initiate a reading procedure when a key element data storage module is brought in contact with the sensor.

BRIEF DESCRIPTION OF THE DRAWINGS

FIG. 1b shows an arrangement according to the invention for the control of several functions with internal addressing of the function elements;

FIG. 1c shows a key element "TIP" with data memory and battery;

DESCRIPTION OF THE PREFERRED EMBODIMENT

Figure 1A:
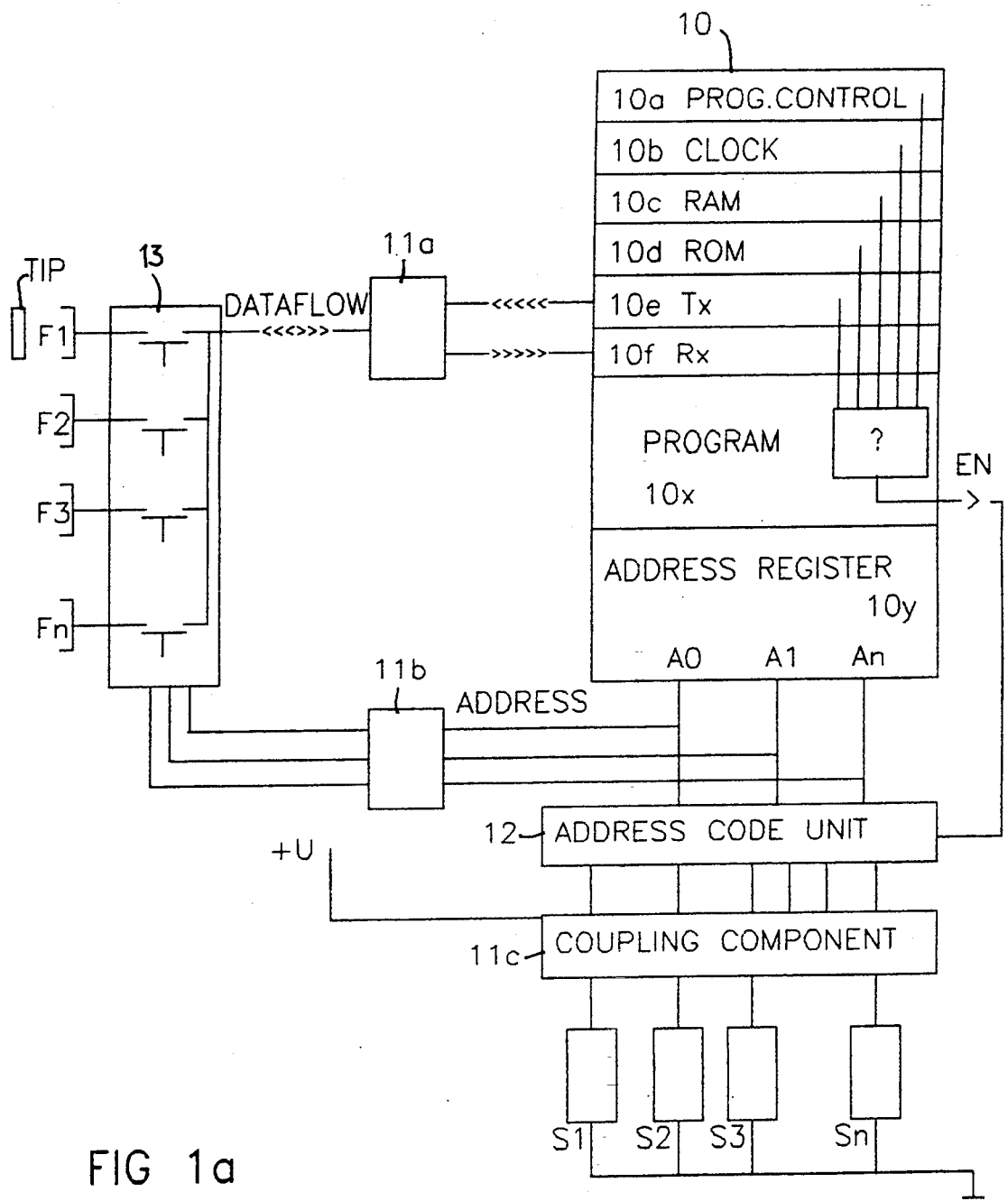
FIG. 1a shows an arrangement according to the invention for the control of several functions with external addressing of the function elements.

FIG. 1a shows the data processing unit of an arrangement according to the invention including a data processor 10 as the main component. The processor 10 comprises, as represented by respective blocks, a program control portion 10a, a clock 10b, a RAN-write-/read memory 10c, a ROM program memory 10d, a transmission register (Tx) 10e, a receiver register (Rx) 10f, a central program processor 10x and an address register 10y.

Connected to the processor 10 via an analog multiplexer 13 is a number of metal sensor contacts F1 to Fn for communication with the data storage modules used as the key elements. Data communication of the multiplexer 13 with the transmission register Tx and the receiver register Rx is via a coupling component 11a which provides physical separation.

The address conductors of the multiplexer 13 are connected by gay of an additional coupling component 11b, to the address register 10y which is also connected to an external address code unit 12 to which, by way of a coupling component 11c, the switch elements S1 to Sn are connected which are assigned to the various control functions. A control signal transmission line EN for addressing the respective switch element extends from the central program processor 10x to the address code unit 12.

The number n of the switch elements corresponds to the number n of sensors. Each switch element has a particular sensor assigned to it. The placing of a key element TIP onto one of the sensors results in the addressing of the respective switch element.

FIG. 1b shows a processing unit according to the invention which is modified from that shown in FIG. 1a. A processor 10' again comprises a control portion 10'a, a clock 10'b, a RAN-write/read memory 10'c, a ROM program memory 10'd, a central program processor 10'x and an address register 10'y. In this embodiment however a number of input/output registers 10g to 10j corresponding to the number of sensors is provided. Unlike in the embodiment according to FIG. 1a, wherein a multiplexer is provided for the connection of the sensors F1 to Fn with the input/output registers, in the embodiment according to FIG. 2 the sensors F1 to Fn are directly coupled, via a coupling component 11'a, with the respective assigned input/output register which, in addition, is connected with a respective assigned switch element S1 to Sn via a coupling component 11'c. The control signal transmission line EN' extends from the central program processor to the coupling component 11'c and controls the respective switch element which is connected to the input/output register activated by the sensor that is in communication with the key element TIP.

Consequently, the embodiments according to FIGS. 1a and 1b are different in their way of addressing. With the external address decoding according to FIG. 1a, a signal can be directed directly to a switch element. This results in lower costs for the coupling components if more than two sensors are provided. The embodiment shown in FIG. 1b with internal address processing is the more economical solution if no more than two sensors are provided.

As shown in FIG. 1c the key element TIP includes a data storage module 2, a battery 4, and a contact 6 disposed in a housing 8.

The operation of the processing unit is now explained briefly on the basis of the arrangement according to FIG. 1a.

Address phase: The processor 10 transmits, via its address register 10y, a switch element address to the analog multiplexer 13 which, as a result, interconnects a respective sensor with the processor data connection (transmitter/receiver register) 10e, 10f. The same address information is supplied to the decoder 12.

Reset phase: When the connection is established the processor sends a logic-L-signal through its data connection for a predetermined period of time. When the predetermined period of time has elapsed, the processor can recognize whether or not a key element TIP is in contact with the respective sensor. For this purpose the processor switches the data connection to the receiver and again requests the status for a predetermined time period. If the status corresponds to a logic-H-signal no key element is in contact with the sensor and the processor provides a new address for the multiplexer.

Data phase: If, during a certain period, the transmission level at the data connection corresponds to a logic-L-signal a key element TIP is in contact with the sensor and data exchange can be initiated. This period is not predetermined. At the same time the address of the multiplexer input, that is, of the sensor with which the key element is in contact, is supplied to the address code unit 12.

Signal phase: Here, a data check or data comparison, that is, a processing of the data takes place which have been read from the key element TIP into the data processor in order to, for example, check the identification or transmit information such as registration data back into the key element TIP or to reduce, for example, account values stored in the key element in accordance with the use of service reordered. Furthermore, the data processor provides, via the control signal transmission line EN, a control signal to the respective switch element to initiate the desired action.

After the control signal is received by the respective switch element the described cycle is restarted with the next address in a new address phase.

Functioning, that is, operation of the arrangement according to FIG. 1b, which does not utilize a multiplexer unit, is in a correspondingly modified form and is quite apparent for a person familiar with the field so that a particular description is not necessary.

The physical separation between the sensors and the data inputs at the data processor by means of coupling elements 11 which is necessary for the protection of the data processor switching circuits is made to be bi-directional in the area of the data transmission lines and is single-directional in the area of the address paths. As already mentioned, if more than two sensors are present, the use of a multiplexer is more economical.

Figure 2A:
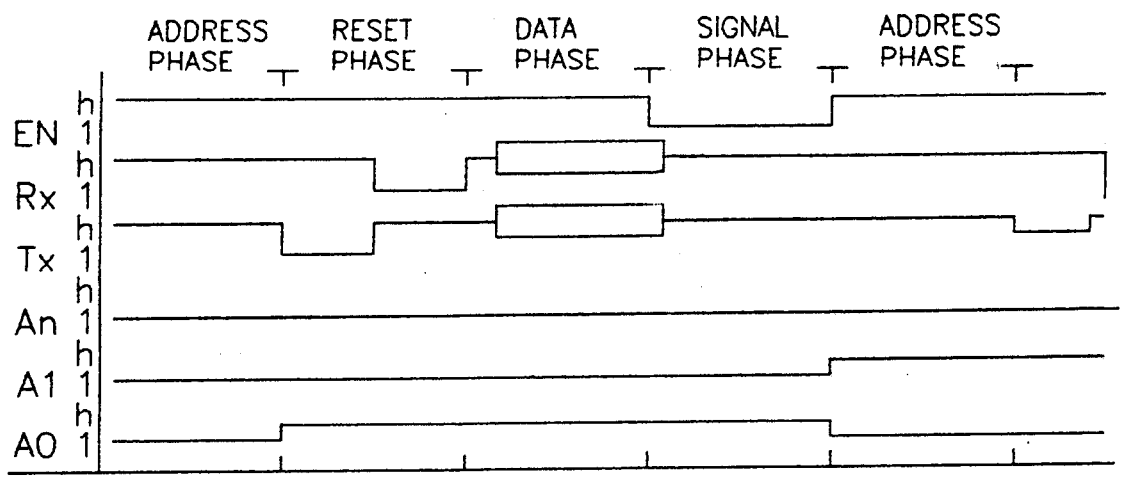
FIGS. 2a, 2b and 2c show diagrams for the clarification of the operation of the data processing unit of the arrangement according to the invention.
Figure 2B:
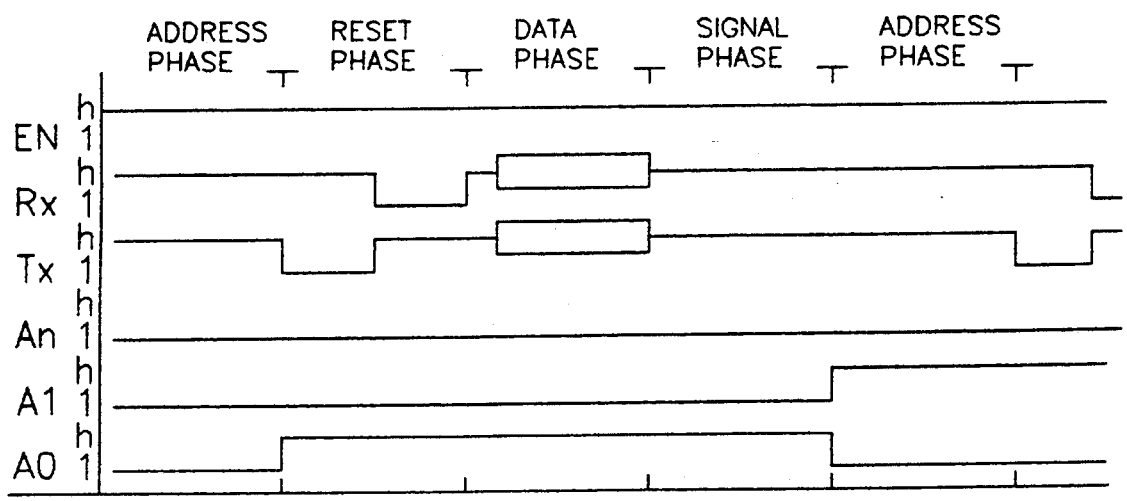
Figure 2C:
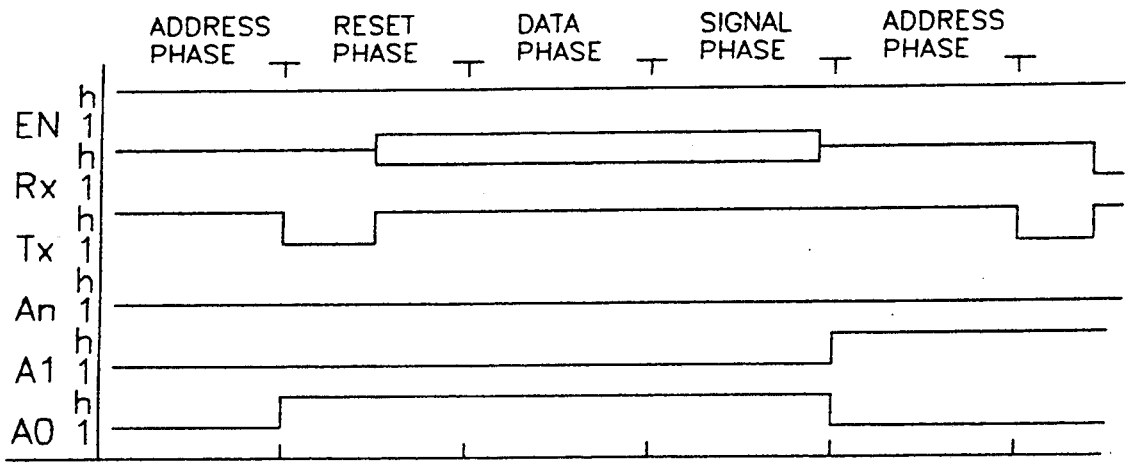

FIGS. 2a, 2b, 2c show the operating cycle explained above. FIG. 2a shows how the switch unit S1 is freed after the data comparison procedure (by control signal EN).

FIG. 2b shows a procedure wherein, upon comparison of the data the switch unit could not be enabled.

FIG. 2c shows the conditions present if a short circuit occurs or a condition is present at the sensor F1 which cannot be identified. In the reset phase, engagement of the sensor F2 by the key element TIP is determined.

Figure 3:
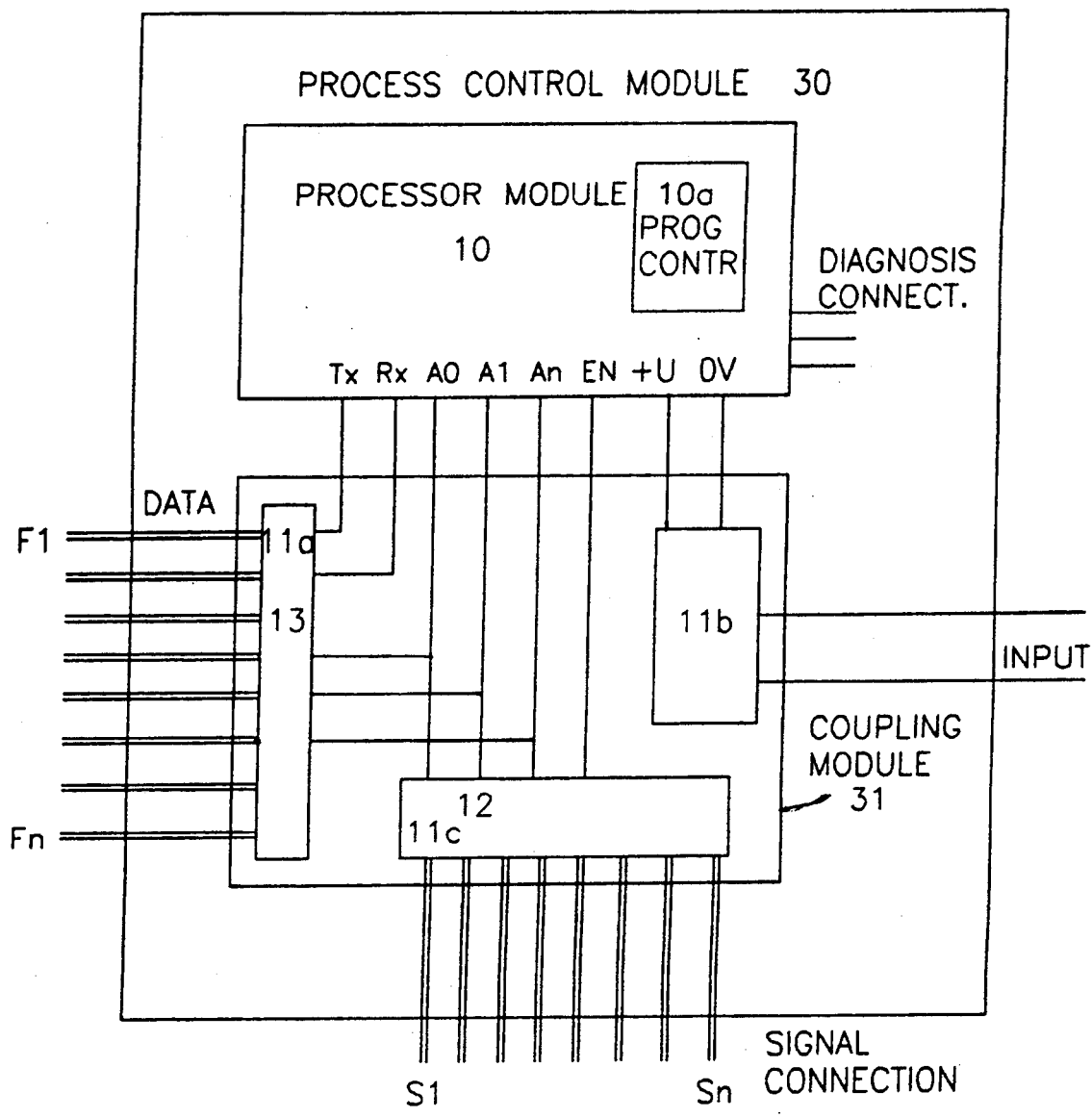
FIG. 3 shows the module set up of the arrangement according to the invention.

FIG. 3 shows an embodiment or a process control unit built actually in modular fashion suitable for mass production. The complete arrangement is designated process control module 30. It comprises a processor module 10 corresponding to the processor or FIG. 1a and a coupling module 31 which includes the coupling elements 11a, 11b, 11c, the multiplexer 13 and the address code unit 12. From the coupling module data transmission lines extend out to the sensors F1 to Fn and to the switch elements S1 to Sn. Electric supply lines also extend from the coupling module. The processor module 10 is provided with a connection for operational testing thereof. The arrangement shown in FIG. 3 accordingly corresponds to the arrangement as shown schematically in FIG. 1a.

Figure 4A:
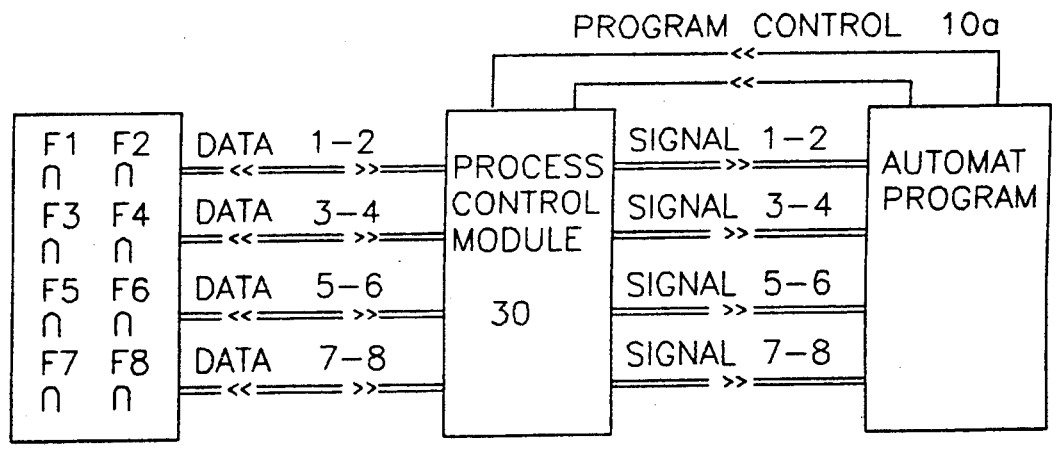
FIGS. 4a, 4b and 4c show schematically various applications for the arrangement according to the invention.

FIG. 4a shows schematically how the process control module 30 can be used, for example, for an automatic gas pump or 8 stamp dispenser. If, for example, the sensor F4 is contacted by the key element TIP, program 4 is initiated causing the gas pump to pump, for example, 40 liters or gasoline while at the same time deducting the amount from the credit account in the key element, or the respective amount or stamps are issued from a stamp dispenser while, at the same time, the corresponding money value is deducted from the key element account corresponding to the program instructions 10a.

Figure 4B:
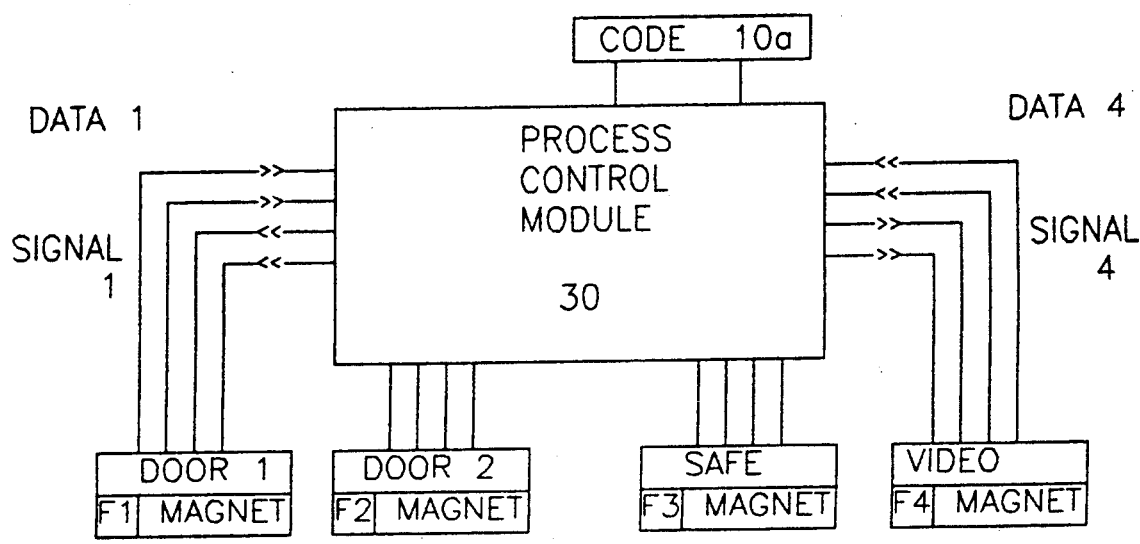

FIG. 4b shows schematically the possible use of the arrangement according to the invention with the program control module 30 for the opening or various doors or the start-up or certain equipment after confirming authorization by means of a key element TIP.

Figure 4C:
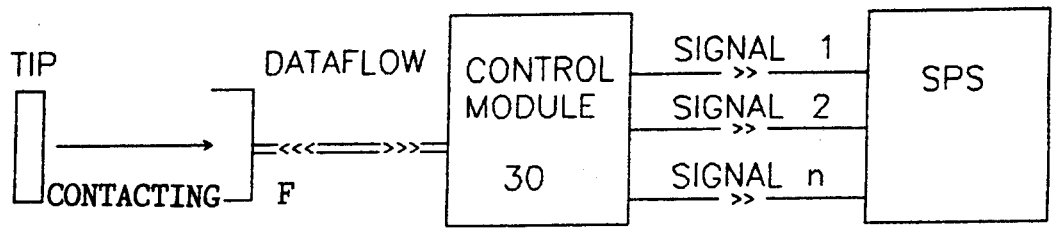

FIG. 4c shows an arrangement wherein via process control module 30, for example, a safety lock SPS may be operated in various ways, that is, with various signals 1,2---n by means of a key element TIP by various authorized users with different degrees of authorization.

Figure 5A:
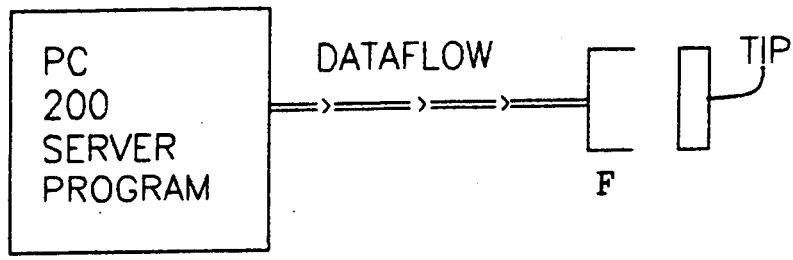
FIGS. 5a and 5b show the programming procedure for the key element and the use thereof in a money machine for the release of a certain amount of money.

FIG. 5a shows schematically how using a personal computer, for example, a money amount value can be entered into the memory of a key element TIP through a sensor F.

Figure 5B:
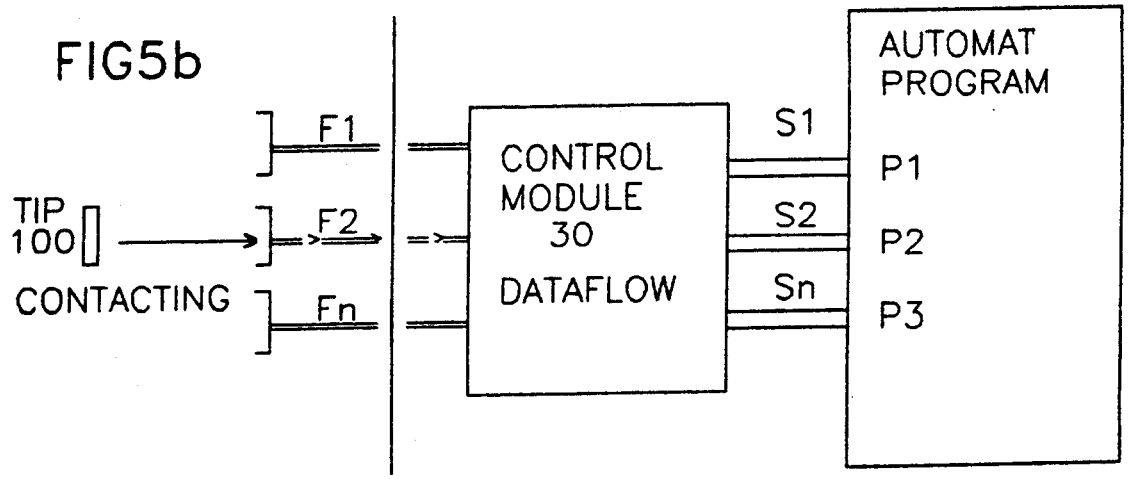

FIG. 5b shows a practical use of a key element TIP programmed in accordance with FIG. 5a, wherein by bringing the key element TIP in contact with an appropriate sensor (for example, F2) a certain amount of money can be called up via the program control module 3 with the aid of a particular program P2 selected from a plurality of programs P1, P2, P3 by activation of the sensor F2.

Figure 6A:
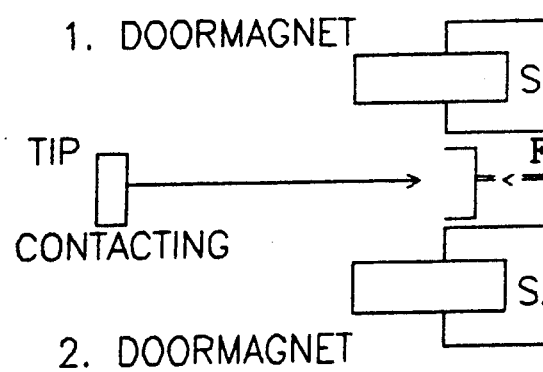
FIGS. 6a and 6b show the use and analysis of a key element in an arrangement with use recording.

FIG. 6a shows schematically the use of the arrangement according to the invention in connection with a security lock or similar structure, wherein the user, by contacting with the key element TIP the sensors F1 and F2, one after the other, can operate a first door magnet S1 and a second door magnet S2. The arrangement of FIG. 6a, however, may also be used for the selective unlocking of one of two doors by an authorized person, wherein as indicated, not only the door opens but data are also read back into the key element TIP, for example, for recording the amount of authorized use.

Figure 6B:
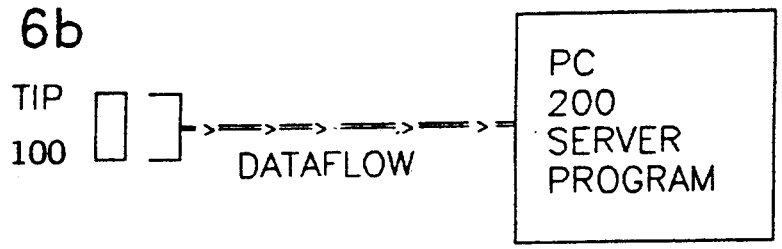

FIG. 6b shows how the data state in a key element TIP can be read by a personal computer to determine the number of uses or the consumed fee units for accounting purposes.

What is claimed is:

1. An electronic arrangement for initiating an action, comprising: a key element including a coded machine readable data memory, and a data processing unit for initiating the action, said data processing unit including a reading head with a plurality of single-contact sensors connected to the data processing unit by means of a coupling component for reading data stored in the key element, a data processor with a program control portion, a clock, a RAM write/read memory, a ROM program memory, a transmission register, a receiver register, a central program processor and an address register, said single-contact sensors being connected to the data processor by means of an analog multiplexer for communication between said key element and the transmission register and the receiver register via coupling components, said analog multiplexer being further connected to the address register by an additional coupling component and the address register being connected to an external address code unit to which switch elements assigned to various control functions are connected, each switch element having one of said single-contact sensors assigned thereto, said key element being a single contact data storage module which, when placed into contact with one of the single-contact sensors, addresses the respective switch element such that data are exchanged, in series bit fashion through a single transmission line, with the key element under the control of the data processing unit.

2. An arrangement according to claim 1, wherein said key element is a capsule in the shape of a disc battery cell which includes therein the data storage module and a battery.

3. An arrangement according to claim 2, wherein the data storage module includes a memory from which information can be removed and into which new information can be inputted.

4. An arrangement according to claim 1, wherein said single contact sensor is a read and write head for bi-directional data exchange with the key element.

5. An arrangement according to claim 1, wherein said data processing unit is activatable by contacting a single contact sensor with said key element.

6. An arrangement according to claim 1, wherein said data processing unit is a modular assembly consisting of at least one processor module and a coupling component via which each sensor and any switch element are connected to the processor module.

7. An arrangement according to claim 1, wherein said single-contact sensors are connected to the rest of said processor unit by a coupling component which is connected to said data processor by a plug-in connector.

8. An arrangement according to claim 1, wherein said data processing unit is adapted to monitor the condition of said single-contact sensors and to automatically react to initiate a reading procedure when a key element is brought into contact with any of said single-contact sensors.

9. An electronic arrangement for initiating an action comprising a key element including a coded machine-readable data memory, and a data processing unit with a plurality of single-contact sensors connected to the data processing unit by means of coupling components for initiating certain actions, said data processing unit having a data processor with a program control portion, a clock, a RAM write/read memory, a ROM program memory, a central program processor and an address register, and a number of input/output registers, a reading head for reading data stored in said key element, said key element being a single-contact data storage module and said reading head including a number of single-contact sensors corresponding to the number of input/output registers through which, upon being contacted by said key element, data are exchanged, in series bit fashion through a single transmission line, with the key element under the control of the processing unit, said sensors being directly coupled, by means of a coupling component, with the respective associated input-/output register which, in addition, by means of a coupling component, is connected with the respective associated switch element.

10. An arrangement according to claim 9, wherein said key element is a capsule in the shape of a disc battery cell which includes therein the data storage module and a battery.

11. An arrangement according to claim 10, wherein the data storage module includes a memory from which information can be removed and into which new information can be inputted.

12. An arrangement according to claim 9, wherein said single-contact sensor is a read and write head for bi-directional data exchange with the key element.

13. An arrangement according to claim 9, wherein said data processing unit is activatable by contacting a single-contact sensor with said key element.

14. An arrangement according to claim 9, wherein said data processing unit is a modular assembly consisting of at least one processor module and a coupling component via which each sensor and any switch element are connected to the processor module.

15. An arrangement according to claim 9, wherein said single-contact sensors are connected to the rest of said processor unit by a coupling component which is connected to said data processor by a plug-in connector.

16. An arrangement according to claim 9, wherein said data processing unit is adapted to monitor the condition of said single-contact sensors and to automatically react to initiate a reading procedure when a key element is brought into contact with any of said single-contact sensors.

* * * * *